(12) United States Patent
Nakajima et al.

(10) Patent No.: US 8,047,946 B2
(45) Date of Patent: Nov. 1, 2011

(54) DIFFERENTIAL CASE FOR VEHICLE AND DIFFERENTIAL DEVICE FOR VEHICLE INCLUDING DIFFERENTIAL CASE

(75) Inventors: Shinichiro Nakajima, Niiza (JP); Hiroshi Takuno, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 812 days.

(21) Appl. No.: 12/048,781

(22) Filed: Mar. 14, 2008

(65) Prior Publication Data

US 2008/0227583 A1    Sep. 18, 2008

(30) Foreign Application Priority Data

Mar. 16, 2007 (JP) ................................ 2007-068733
Mar. 12, 2008 (JP) ................................ 2008-063248
Mar. 12, 2008 (JP) ................................ 2008-063250

(51) Int. Cl.
*F16H 48/06* (2006.01)
*F16H 57/08* (2006.01)

(52) U.S. Cl. ........................................ 475/230; 475/331

(58) Field of Classification Search ................... 475/221, 475/231, 331

See application file for complete search history.

(56) References Cited

U.S. PATENT DOCUMENTS

| 1,446,545 | A | | 2/1923 | Brush et al. |
| 3,438,282 | A | * | 4/1969 | Thornton ..................... 475/234 |
| 7,470,207 | B2 | * | 12/2008 | Todd et al. ..................... 475/230 |
| 7,736,257 | B2 | * | 6/2010 | Nakajima ..................... 475/230 |

FOREIGN PATENT DOCUMENTS

| DE | 100 14 875 A1 | 9/2001 |
| EP | 1 233 211 A1 | 8/2002 |
| JP | 2006-46642 A | 2/2006 |
| WO | WO 92/19888 A1 | 11/1992 |
| WO | WO 2006006524 A1 * | 1/2006 |

OTHER PUBLICATIONS

Extended European Search Report dated Sep. 21, 2010 in corresponding European Application No. 08 15 2777.
U.S. Appl. No. 12/262,688, filed Oct. 31, 2008, Nakajima.

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

It is an object of the present invention to provide a differential case for a vehicle and a differential device for a vehicle restricting change and movement of an intermeshing of a pair of side gears and a pair of pinion gears to achieve stable differential restriction force.

The differential case or the differential device for the vehicle comprises a case body 50 accommodating a pair of side gears 5R, 5L and a pinion gear 3 or 4 engaging in mesh with the side gears 5R, 5L, and a pinion gear supporter 53 accommodated in said case body 50 and having a pinion gear supporting portion 56 or 57 to install said pinion gear 3 or 4 in recess space 60, 61 of said pinion gear supporter 53 and to support slidably an outer peripheral surface of said pinion gear 3 or 4 for rotation of said pinion gear 3 or 4.

13 Claims, 12 Drawing Sheets

DIFFERENTIAL CASE FOR VEHICLE AND DIFFERENTIAL DEVICE FOR VEHICLE INCLUDING DIFFERENTIAL CASE

INCORPORATION BY REFERENCE

The present application claims priority under 35 U.S.C. §119 to Japanese Patent Applications No. 2007-068733, filed on Mar. 16, 2007, 2008-063248, filed on Mar. 12, 2008 and 2008-063250 filed on Mar. 12, 2008. The content of the application is incorporated herein by reference in their entirety.

BACKGROUND OF THE INVENTION

1. Field of the Invention

The present invention relates to a differential case for a vehicle and a differential devise for a vehicle including the differential case, and more particularly relates to the differential case for the vehicle and the differential devise for the vehicle having a pinion gear supporting portion supporting slidably a pinion gear which is a shaft-less type.

2. Description of the Prior Art

It is well known for a prior differential device for a vehicle to provide a pair of shaft-less pinion gears as disclosed in a published patent document; Tokkai 2006-46642.

This differential device for the vehicle comprises a differential case rotated by torque from an engine, a pair of pinion gears, a pair of side gears engaging in mesh with the pair of pinion gears in a state that an axis of the pinion gears is perpendicular to that of side gears, a pair of thrust washer receiving thrust force from the pair of side gears.

The pair of pinion gears has a gear peripheral portion as a supported portion over all around periphery and a gear engaging portion engaging in mesh with the pair of side gears and the pair of pinion gears are disposed in the differential case on an axis perpendicular to a rotational axis of the differential case.

The differential case is equipped with a pair of wheel shaft inserted holes. The differential case is also equipped with a pinion gear inserted hole having first pinion gear supporting surface to support slidably, that is rotatably, peripheral surfaces of a pair of pinion gears. On a peripheral edge of an inner opening of the pinion gear inserted hole is formed a second pinion gear supporting surface supporting slidably a part of the gear engaging portion of the pinion gear.

The pair of side gears is constructed with an annular bevel gear having a large diameter than that of the pinion gears and is installed on a rotational axis of the differential case. An inside surface of the pair of side gears is connected with right and left tire shafts in a spline engagement.

A pair of thrust washers is installed between back surfaces of the pair of side gears and an annular inner opening edged of a pair of the wheel shaft inserted holes. It can be adjusted a degree of intermeshing engagement of the pair of side gears with the pair of pinion gears by the thrust washers.

Based on the above-mentioned construction of the prior art, when torque from an engine is input into the differential case through a driving pinion and a ring gear, the differential case is rotated around the rotational axis. At the rotation of the differential case, the rotational force is transmitted to the pair of pinion gears and the pair of side gears through the pair of pinion gears. Therefore, the torque is distributed and transmitted differentially to right and left tire shafts through the drive pinion, the ring gear, the differential case, the pair of pinion gears and the pair of side gears according to a running condition of the vehicle since the pair of side gears engages with right and left tire shafts in the spline engagement.

In running of the vehicle, the pinion gears slide on the first pinion gear supporting surface and the second pinion gear supporting surface upon the rotation of the pinion gears, frictional resistance is occurred between the first pinion gear supporting surface and the pinion gears and also between the second pinion gear supporting surface and the pinion gears to restrict the differential rotation of the side gears.

And also in this time, another thrust force of an intermeshing surface of the pinion gears with the side gears, therefore, this thrust force acts the pair of side gears to be moved to separated directions each other. In this result, there occurs another frictional resistance between the thrust washers and the thrust washer receiving portions to restrict the differential rotation of the side gears also.

However, in the differential device for the vehicle of the published patent document of Tokkai 2006-46642 as the prior art, since an extending portion is formed on the annular inner opening edge of the pinion gear inserted holes and a free edge of the extending portion is not fixed, a bending stiffness of the extending portion is poor by receiving the load from the side gears through the pinion gears. As a result, it is easy to deform the extending portion to change and move an intermeshing position between the pinion gears and the side gears so that it restricts stable differential restriction force upon occurrence of excessive torque.

SUMMARY OF THE INVENTION

In view of the previously mentioned circumstances, it is an object of the present invention to provide a differential case for a vehicle and a differential device for a vehicle restricting change and movement of an intermeshing of a pair of side gears and a pair of pinion gears to achieve stable differential restriction force.

It is another object of the present invention to provide a differential case for a vehicle and a differential device for a vehicle maintaining the stable intermeshing point between a pair of side gears and a pair of pinion gears to achieve stable differential restriction force.

In order to achieve the above and other objects, one aspect of the present invention provides a differential case for a vehicle or a differential device therefor to have mainly a pinion gear supporter having a pinion gear supporting portion to install a pinion gear in a recess space of the pinion gear supporter and to support slidably an outer peripheral surface of the pinion gear for rotation of the pinion gear. Thereby, the pinion gear is supported by rigid pinion gear supporting portion of the pinion gear supporter without supporting by any extending portion having the non-rigid free edge, as explained by the prior art, to achieve stable intermeshing of the side gear and the pinion gear, thereby to make stable differential restriction force.

Second aspect of the present invention provides a differential case for a vehicle or a differential device for a vehicle with the pinion gear supporter having a pair of said pinion gear supporting portions, and a reinforced connecting portion connecting the pair of pinion gear supporting portions each other. Thereby, load acted on the pair of pinion gear supporting portions from a pair of side gears through a pair of pinion gears is received by the reinforced connecting portion so that bending intensity of the pinion gear supporter is increased to achieve stable intermeshing of the pair of side gears and the pair of pinion gears, thereby to make stable differential restriction force.

Third aspect of the present invention provides a differential case for a vehicle or a differential device for a vehicle having mainly the pair of pinion gear supporting portions having respectively first pinion gear supporting portion and second pinion gear supporting portion, the first pinion gear supporting portion supports rotatably the outer peripheral surface of an end portion in a side of a gear base of both ends of the pinion gear along its axial direction, and the second pinion gear supporting portion supports rotatably said outer peripheral surface of an end portion in a side of a gear nose of both ends of the pinion gear along its axial direction. Thereby, the pinion gear is supported at two points in the side of the gear base and the gear nose so that any inclination of the pinion gear is restricted to achieve stable intermeshing of the pair of side gears and the pair of pinion gears, thereby to make stable differential restriction force.

Fourth aspect of the present invention provides a differential case for a vehicle or a differential device for a vehicle having mainly the pinion gear supporter to be movable along the rotational axis of the differential case. Thereby, during the rotation of the differential case, the pinion gear supporter moves by itself in the direction of the rotational axis of the differential case to be positioned at the place where the pinion gears equally engage in mesh with the right side gear and the left side gear to maintain stable intermeshing of the pair of side gears and the pair of pinion gears to achieve stable differential restriction force.

Fifth aspect of the present invention provides a differential device for a vehicle with the pair of pinion gears having respectively a first sliding portion to be slid on the pair of pinion gear supporting portions at an opposite side to the rotational axis side of the differential case of both sides of the pinion gear supporting portion along axial direction of the pinion gear supporting portions, a second sliding portion to slide on said pair of pinion gear supporting portions at a side of rotational axis of said differential case of both sides of the pinion gear supporting portion along axial direction of said pinion gear supporting portions. Thereby, the pinion gears are respectively supported by two points of first sliding portion in the opposite side to the rotational axis and the side of the rotational axis so that any inclination of the pinion gear is restricted to achieve stable intermeshing of the pair of side gears and the pair of pinion gears, thereby to make stable differential restriction force

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

First Embodiment of the Present Invention

[Whole Construction of the Differential Device for the Vehicle]

Figure 1:
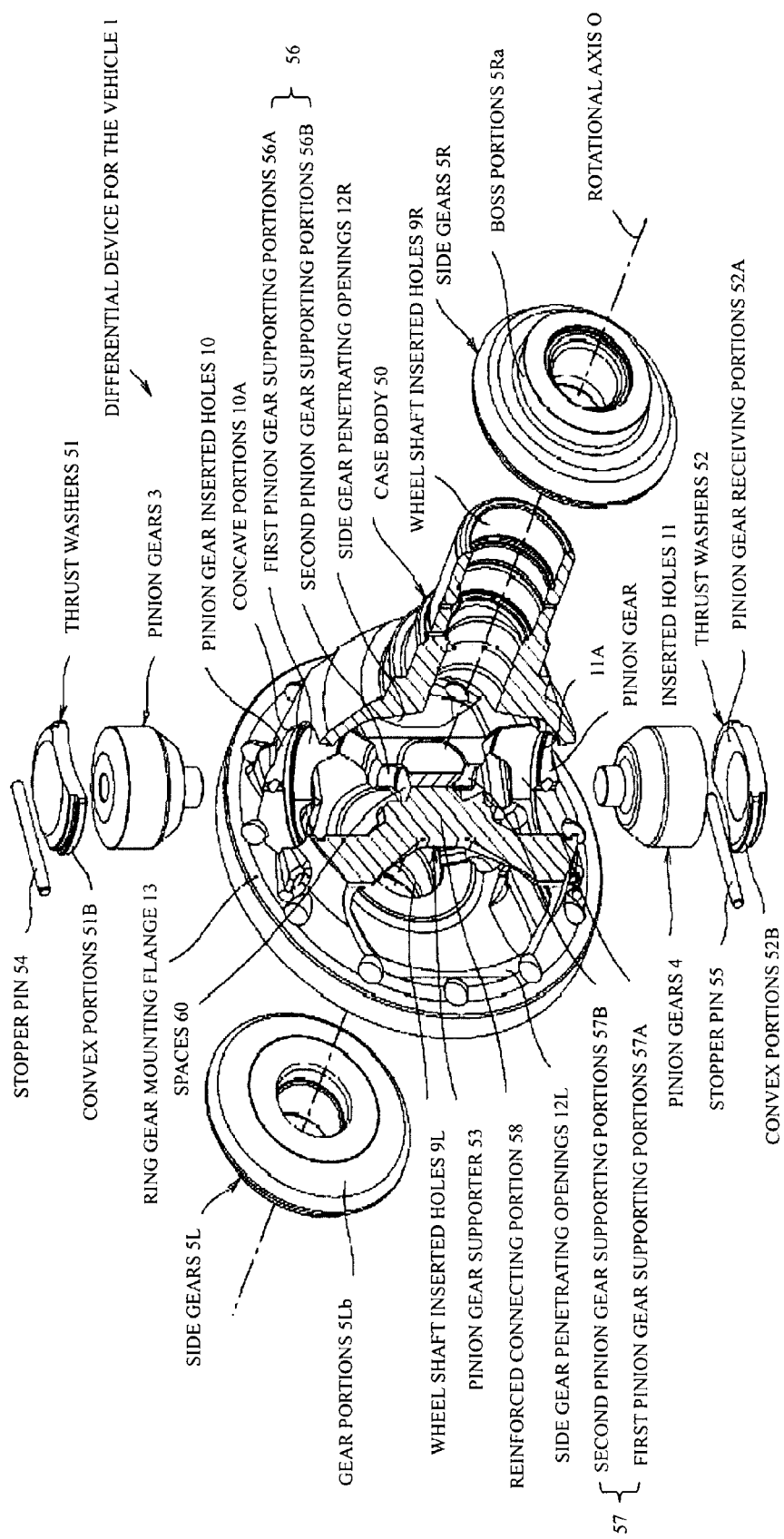
FIG. 1 is a divided oblique perspective diagram explaining a differential device for a vehicle according to first embodiment of the present invention.
Figure 2:
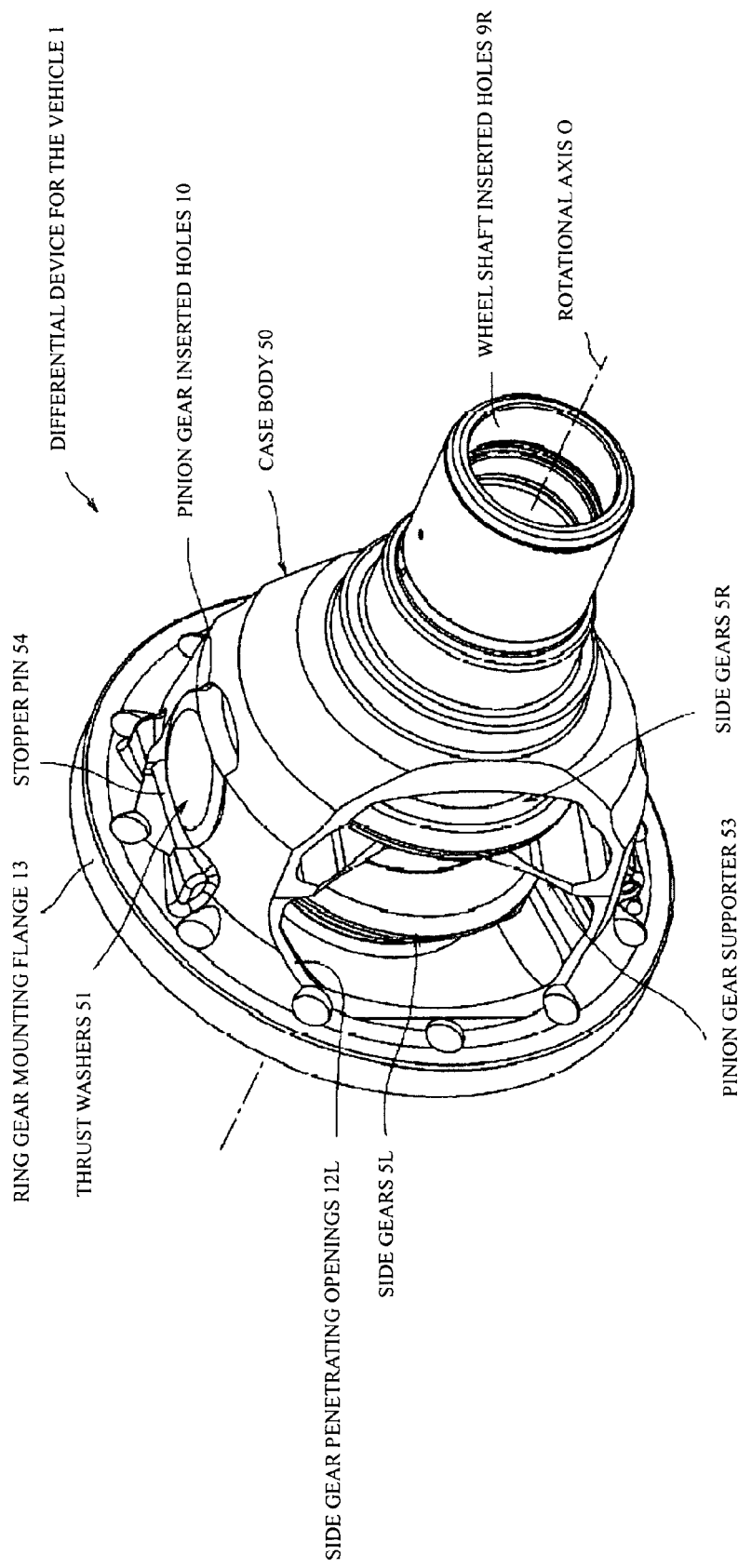
FIG. 2 is an assembled oblique perspective diagram explaining a differential device for a vehicle according to first embodiment of the present invention.
Figure 3:
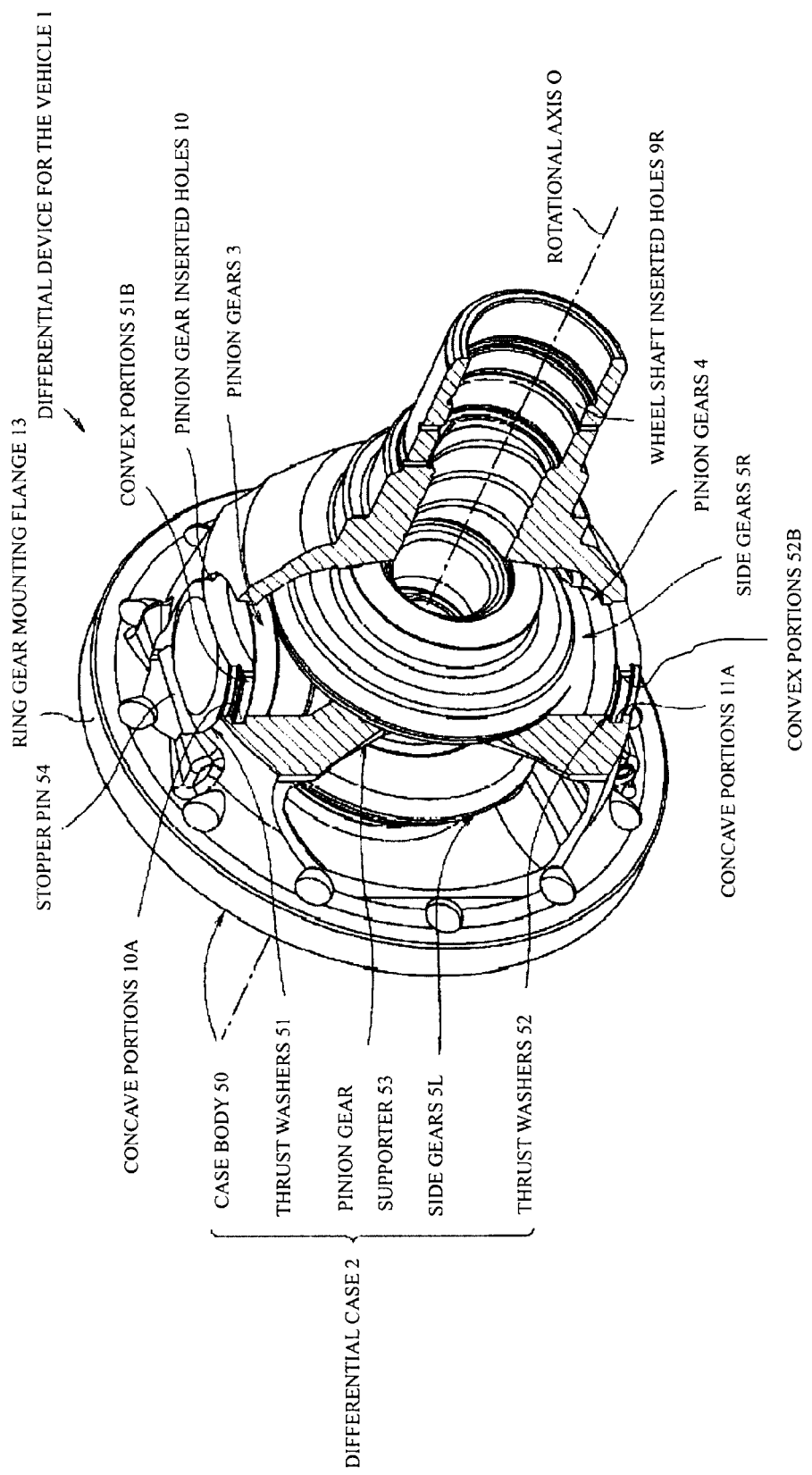
FIG. 3 is a partially cut oblique perspective diagram explaining a differential device for a vehicle according to first embodiment of the present invention.
Figure 4:
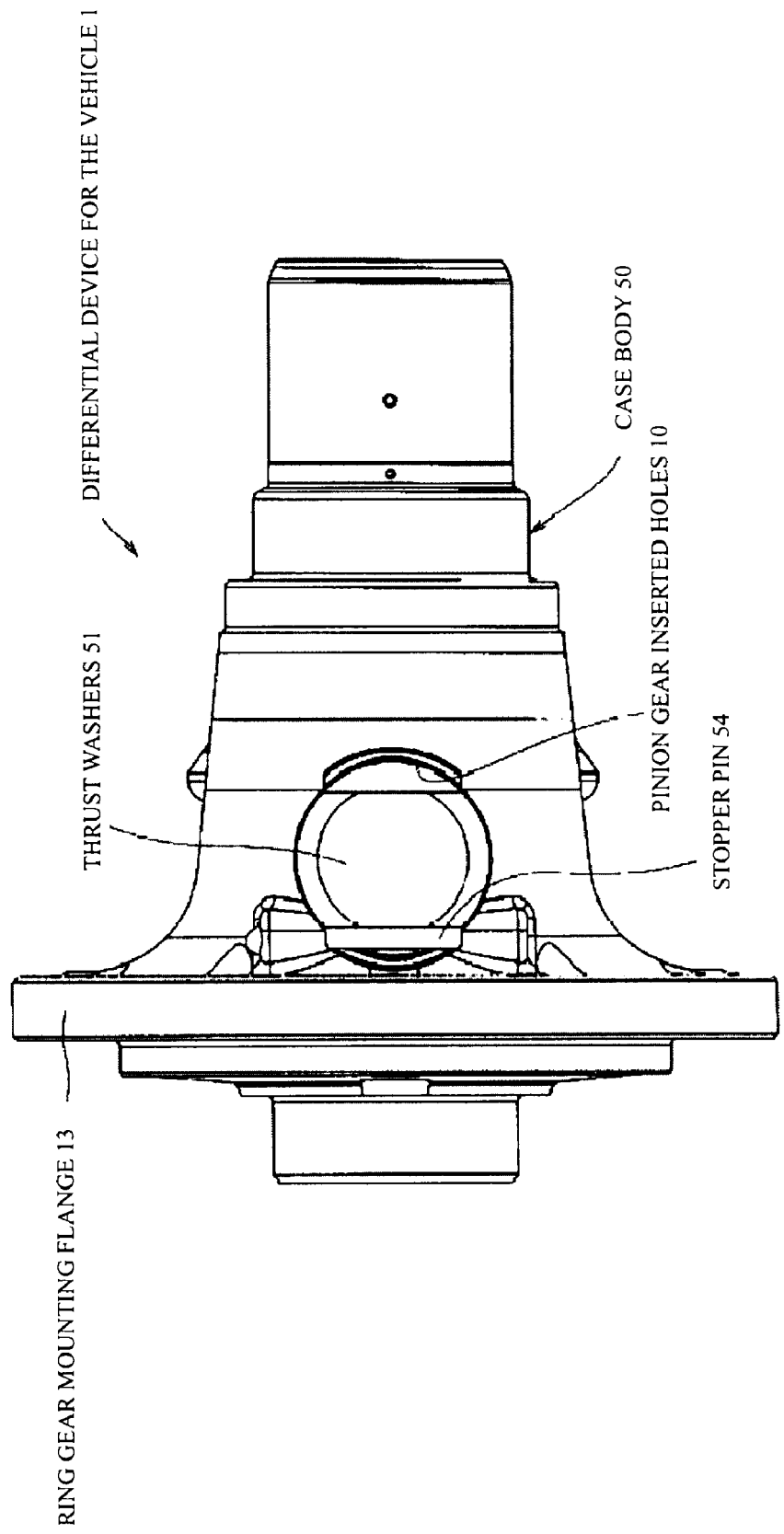
FIG. 4 is a horizontally sectional drawing explaining a differential device for a vehicle according to first embodiment of the present invention.

In FIGS. 1 to 3, a numeral 1 shows the differential device for the vehicle according to the first embodiment of the present invention. The differential device 1 mainly constitutes of a differential case 2, two pinion gears 3, 4 and two side gears 5R, 5L. The differential case 2 is rotated by receiving a torque from an engine. The pinion gears 3, 4 are aligned in parallel each other along a perpendicular line to a rotational axis O of the differential case 2. The pinion gears 3, 4 intermesh with the side gears 5R, 5L.

[Construction of the Differential Case 2]

As shown in FIGS. 1-3 and 6, the differential case 2 provides a case body 50, thrust washers 51, 52 and a pinion gear supporter 53, and the differential case 2 is constructed as a hollow construction driven around the rotational axis O. The case body 50 accommodates therein the pinion gears 3, 4 and the side gears 5R, 5L. The thrust washers 51, 52 close respectively a portion of pinion gear inserted holes 10, 11, described latter, of the case body 50. The pinion gear supporter 53 supports rotatably both of the pinion gears 3, 4.

Figure 5:
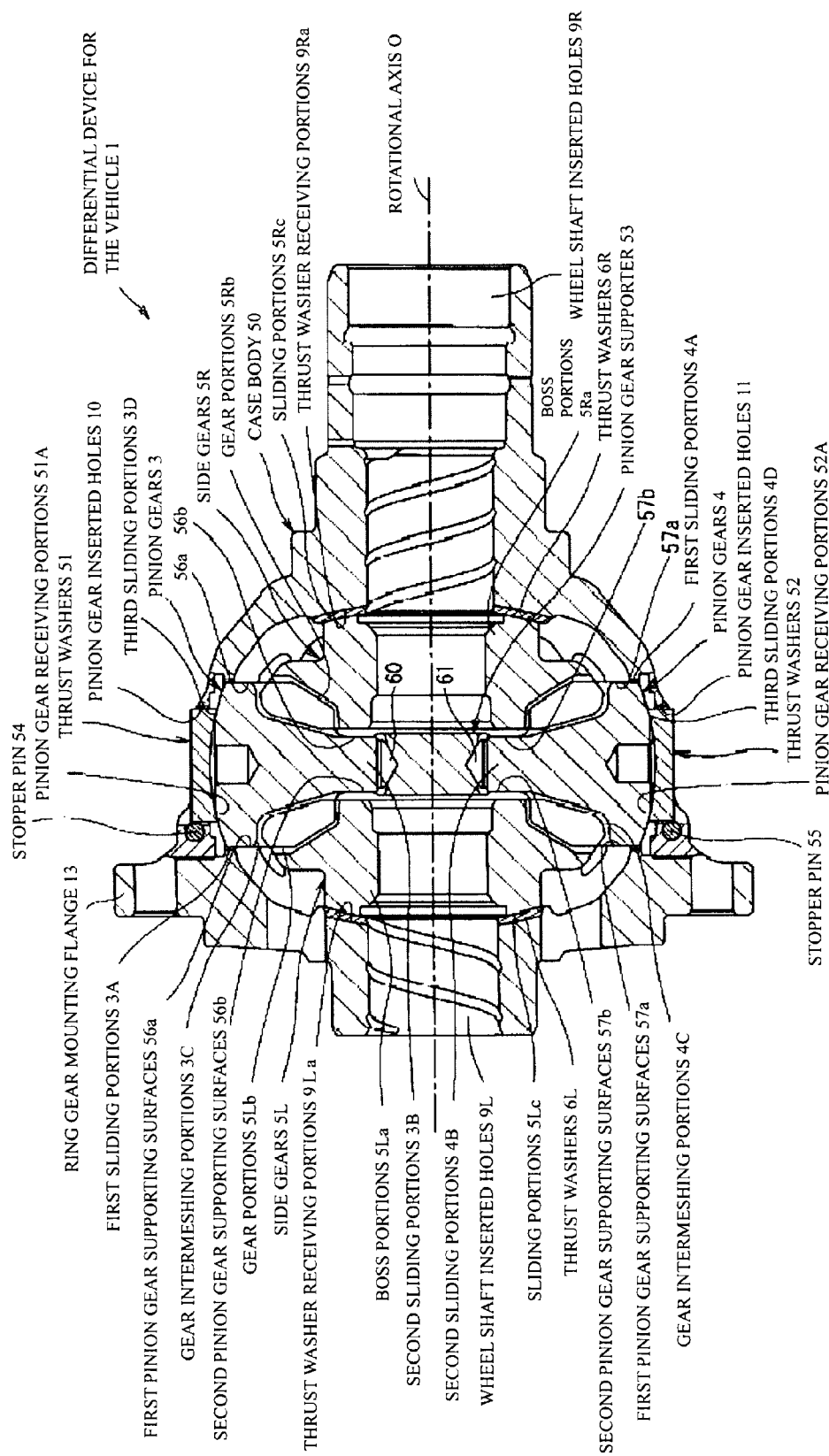
FIG. 5 is a horizontally cut sectional drawing in parallel to a rotational axis explaining a differential device for a vehicle according to first embodiment of the present invention.

In the case body 50, as shown in FIG. 1 and FIG. 5, there are formed two right and left wheel shaft inserted holes 9R, 9L and a pair of pinion gear inserted holes 10, 11. The wheel shaft inserted holes 9R, 9L are opened along the rotational axis O. The pinion gear inserted holes 10, 11 are opened to a perpendicular direction to axes of the wheel shaft inserted holes 9R, 9L aligning with the rotational axis O. And also in the case body 50, there are installed a pair of side gear penetrating openings 12R, 12L positioned in equal distance respectively from the pinion gear inserted holes 10, 11 along a peripheral direction as shown in FIG. 1 and positioned in a right side and a left side of the pinion gear supporter 53 along the rotational axis O as shown in FIG. 2. In the case body 50 is formed, as a whole body, an annular ring gear mounting flange 13 positioned along the peripheral direction in the plane perpendicular to the rotational axis O as shown in FIGS. 1 to 6.

The wheel shaft inserted holes 9R, 9L are constructed as a penetrating hole being approximately circle to have almost same diameter. Unillustrated right and left wheel shafts are inserted into the wheel shaft inserted holes 9R, 9L. On peripheral annular ends of the wheel shaft inserted holes 9L, 9R are mounted thrust washer receiving portions 9Ra, 9La receiving the thrust washers 6L, 6R and being spherical.

The pinion gear inserted holes 10, 11 have concave portions 10A, 11A being fit by a portion of peripheral ends of the thrust washers 51, 52 on internal surface of the opening of the pinion gear inserted holes 10, 11 as shown in FIG. 1 and FIG. 5. The pinion gear inserted holes 10, 11 are constructed as a penetrating hole penetrating between outer and inner areas of the case body 50 in order to achieve a function to insert the pinion gears 3, 4 from the outer area into inner area of the case body 50. For this purpose, each size of inner diameter of the pinion gear inserted holes 10, 11 is larger than each of outer diameters of the pinion gears 3, 4.

Figure 6:
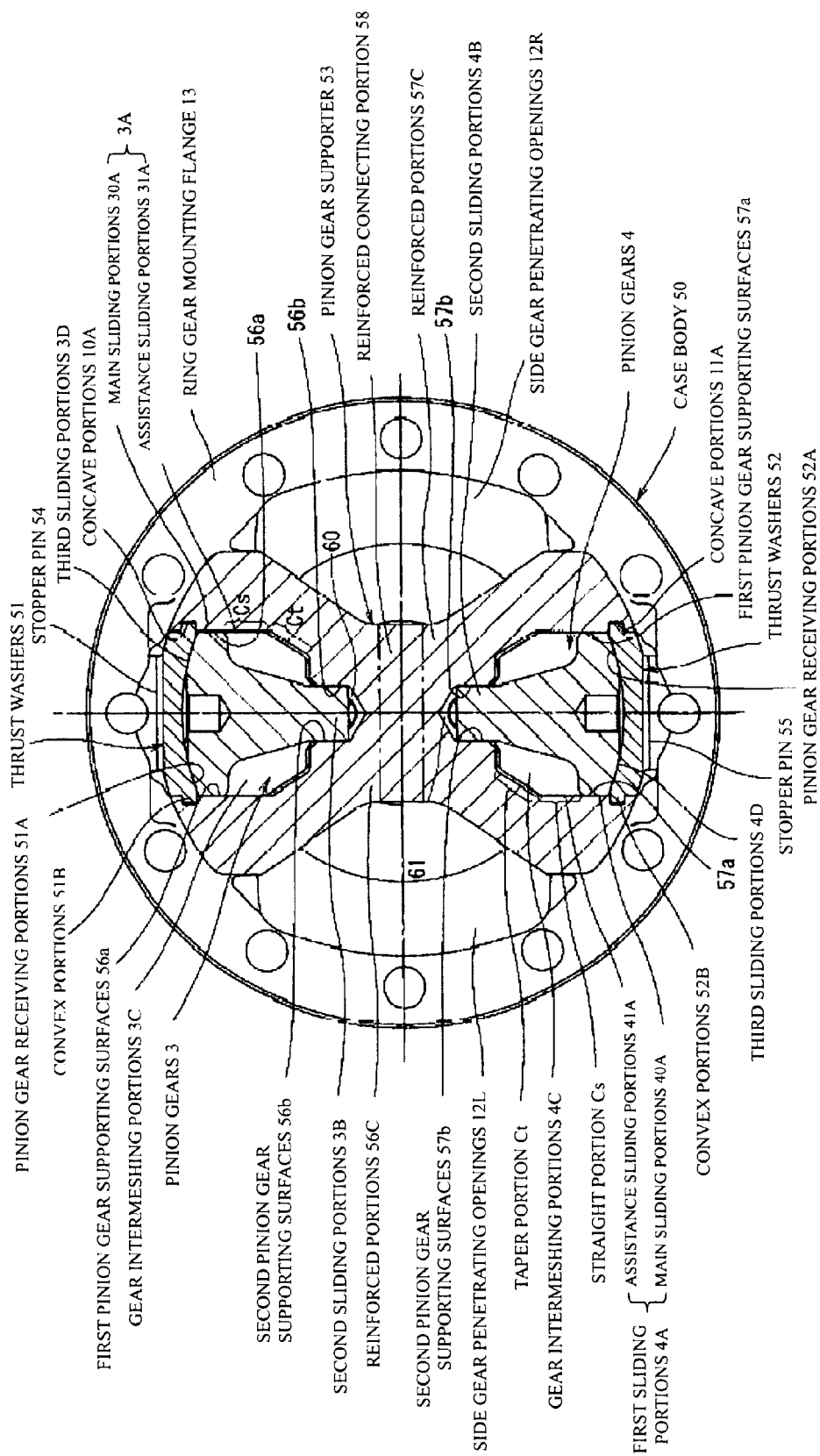
FIG. 6 is a cross sectional drawing cut in perpendicular to a rotational axis of a differential case of a differential device for a vehicle according to first embodiment of the present invention.

The side gear penetrating openings 12R, 12L are constructed as a penetrating hole having an opening being non-circular in a cross section as shown in FIG. 1 and FIG. 6. A size of the opening is set to be able to be inserted the side gears 5R, 5L into the differential case 2.

The thrust washers 51, 52 have pinion gear receiving portions 51A, 52A and convex portions 51B, 52B, and are positioned in back side of the pinion gears 3, 4 as shown in FIG. 1 and FIG. 3. The pinion gear receiving portions 51A, 52A are constructed respectively by spherical surfaces fitting to a sliding surface of the back surface of the pinion gears 3, 4. The convex portions 51B, 52B are rotatably supported by the concave portions 10A, 11A of the pinion gear inserted holes 10, 11. And the thrust washers 51, 52 are fixed to be positioned along an axial direction of the pinion gear inserted holes 10, 11 by fitting the convex portions 51B, 52B into the concave portions 10A, 11A and around the axis of the pinion gear inserted holes 10, 11 by a stopper pin 54, 55. And the pinion gear receiving portions 511A, 52A are constructed to support slidably the pinion gears 3, 4.

The pinion gear supporter 53 has pinion gear supporting portions 56, 57 accommodating the pinion gears 3, 4 in recess spaces 60, 61 to be concave in a cross section in order to support rotatably the pinion gears 3, 4, as shown in FIG. 1 and FIG. 6. Upper and lower ends of the pinion gear supporter 53 are mounted as a whole to be approximately coincided with the inner ends of the openings of the pinion gear inserted holes 10, 11. The whole construction of the pinion gear supporter 53 is liked as a letter X.

The pinion gear supporting portions 56, 57 have first pinion gear supporting portions 56A, 57A and second pinion gear supporting portions 56B, 57B and are mounted to be a whole body each other through a reinforced connecting portion 58 positioned on the rotational axis O of the differential case 2, as shown in FIG. 1 and FIG. 6. The first pinion gear supporting portions 56A, 57A rotatably support each of first sliding portions and a part of gear intermeshing portions of the pinion gears 3, 4 which are outer ends of both ends of each pinion gears 3, 4 in its axial direction located in a side of pinion gear inserted hole, that is a side of a gear base. The second pinion gear supporting portions 56B, 57B rotatably support each of second sliding portions of the pinion gears 3, 4 which are inner ends of both ends of each pinion gears 3, 4 in its axial direction located in the opposite side of pinion gear inserted hole, that is a side of a gear nose.

The first pinion gear supporting portions 56A, 57A are respectively disposed at a plurality of positions, two positions in this embodiment, in a peripheral side of the pinion gears 3, 4 around the axial direction of the pinion gear inserted holes 10, 11 in equal distance each other, as shown in FIG. 1. On the first pinion gear supporting portions 56A, 57A are equipped with first pinion gear supporting surfaces 56a, 57a being a curvature surface having a curvature of a predetermined radius as shown in FIGS. 1, 5, 6.

The second pinion gear supporting portions 56B, 57B are respectively disposed in a side of rotational axis O of the pinion gear supporting portions 56 57 at a plurality of positions, two positions in this embodiment, around the axial direction of the pinion gear inserted hole 10, 11 in equal distance each other, as shown in FIG. 1. The second pinion gear supporting portions 56B, 57B are respectively mounted as a whole body through the reinforced portions 56C, 57C at the side of the rotational axis O of the differential case 2 as shown in FIG. 6. Since the reinforced portions 56C, 57C achieve a function of a horizontal beam to support a load acted on the pinion gear supporting portions 56, 57 of the pinion gear supporter 53 through the pinion gears 3, 4 from the side gears 5R, 5L, the pinion gear supporter 53 having the letter X construction is increased its rigidity of bending intensity. On the second pinion gear supporting portions 56B, 57B are equipped with second pinion gear supporting surfaces 56b, 57b being a curvature surface having a curvature of a predetermined radius, which is smaller than the radius of the curvature of the first pinion gear supporting portions 56a, 57a, as shown in FIGS. 1, 5, 6.

A width along the rotational axis O of the right and left sides of the pinion gear supporter 53 perpendicular to the rotational axis O in FIG. 6 is enough smaller than that of middle portion of the pinion gear supporter 53 as shown in FIGS. 2, 3 in order to allow insertions of the side gears 5R, 5L through the side gear penetrating holes 12R, 12L. This small width of the right and left sides of the pinion gear supporter 53 and the letter X construction of the pinion gear supporter make a total weight of the pinion gear supporter 53 relatively small. Besides, the width of the reinforced portion 56C, 57C along the rotational axis O is enough length to be reinforced as shown in FIG. 1.

[Construction of the Pinion Gears 3, 4]

The pinion gears 3, 4 are, as shown in FIGS. 5, 6, a shaftless cylindrical gears including first sliding portions 3A, 4A, second sliding portions 3B, 4B and gear intermeshing portions 3C, 4C. The pinion gears 3, 4 are rotatably supported by the first pinion gear supporting surfaces 56a, 57a and the second pinion gear supporting surfaces 56b, 57b of the pinion gear supporter 53 without being supported by any shaft, that is the shaft-less construction. The first sliding portions 3A, 4A including a part of the gear intermeshing portion are slid on the pinion gear supporter 53, based on the rotation of the pinion gears 3, 4, in the side of the gear base of the pinion gear inserted hole, which is the opposite side to the rotational axis O of the differential case 2 of both sides of the pinion gear supporter 53. A gear tooth is formed on the gear intermeshing portion. The second sliding portions 3B, 4B are slid, based on the rotation of the pinion gears 3, 4, in the side of the rotational axis O of both sides of the pinion gear supporter 53 in the axis direction. The gear intermeshing portions 3C, 4C engage in mesh with the side gears 5R, 5L between the first sliding portions 3A, 4A and the second sliding portions 3B, 4B. The pinion gears 3, 4 are disposed on an axis perpendicular to the rotational axis O of the differential case 2.

It is defined that the side of the gear nose is the side of the rotational axis O selected from the group of both sides of the pinion gear supporter 53 in its axis and the side of the gear base is the opposite side to the rotational axis O selected from the group of both sides of the pinion gear supporter 53 in its axis.

The first sliding portions 3A, 4A have annular main sliding portions 30A, 40A and assistance sliding portions 31A, 41A as shown in FIG. 6. The main sliding portions 30A, 40A have a function as a supported portion to be supported all peripheral portions on the outer surface of the pinion gears 3, 4 around its axis. The assistance sliding portions 31A, 41A have a function as a supported portion to be supported a part of peripheral portions on the outer surface of the pinion gears 3, 4 around its axis and the part is a part of the gear intermeshing portions 3C, 4C formed the gear tooth. The first sliding portions 3A, 4A are placed in the side of the gear base of both ends of each pinion gears 3, 4 in its axial direction located in a side of the pinion gear inserted hole, and are rotatably supported by the first pinion gear supporting surfaces 56a, 57a of the first pinion gear supporting portions 56A, 57A. On a back surface of the main sliding portions 30A, 40A of the first sliding portions 3A, 4A are equipped with third sliding portions 3D, 4D formed by a spherical surface fitting to the pinion gear receiving portions 51A, 52A of the thrust washers 51, 52.

The second sliding portions 3B, 4B are a cylindrical body having a function as a supported portion at all portions around the axis of the pinion gears 3, 4 as shown in FIGS. 5, 6. The second sliding portions 3B, 4B are placed in the side of the gear nose of both ends of each pinion gears 3, 4 in its axial direction, and are rotatably supported by the second pinion gear supporting surfaces 56b, 57b of the second pinion gear supporting portions 56B, 57B. Each of outer diameters of the second sliding portions 3B, 4B is set to be smaller than that of the first sliding portions 3A, 4A.

The gear intermeshing portions 3C, 4C comprise a straight portion Cs including the assistance sliding portions 31A, 41A of the pinion gears 3, 4 and a taper portion Ct continuing from the straight portion Cs as shown in FIG. 6, and it is engaged in mesh with the side gears 5R, 5L in a side of the rotational axis O of the differential case 2.

[Construction of the Side Gears 5R, 5L]

As shown in FIG. 5, the side gears 5R, 5L are almost ring gears having boss portions 5Ra, 5La and gear portions 5Rb, 5Lb, each diameter of which is different each other. An outer diameter of the side gears 5R, 5L is larger than the outer diameter of the pinion gears 3, 4 and the side gears 5L, 5R are a bevel gear having a single conical angle. The side gears 5R, 5L are rotatably supported in the differential case 2 to engage in mesh with the pinion gears 3, 4. A number of teeth of the side gears 5R, 5L is more than 2.1 times as many numbers as that of teeth of the pinion gears 3, 4, for example, the number of teeth of the side gears 5R, 5L is 15, compared that the number of teeth of the pinion gears 3, 4 is 7. The outer diameter of the side gears 5R, 5L is set to be larger than the outer diameter of the pinion gears 3, 4.

On a back face of the side gears 5R, 5L are provided sliding portions 5Rc, 5Lc being a spherical surface to fit to the thrust washer receiving portions 9Ra, 9La through the thrust washers 6R, 6L. Each wheel shaft is individually inserted into the wheel shaft inserted holes 9R, 9L in spline meshing.

[Operation of the Differential Device 1 for the Vehicle]

Figure 7:
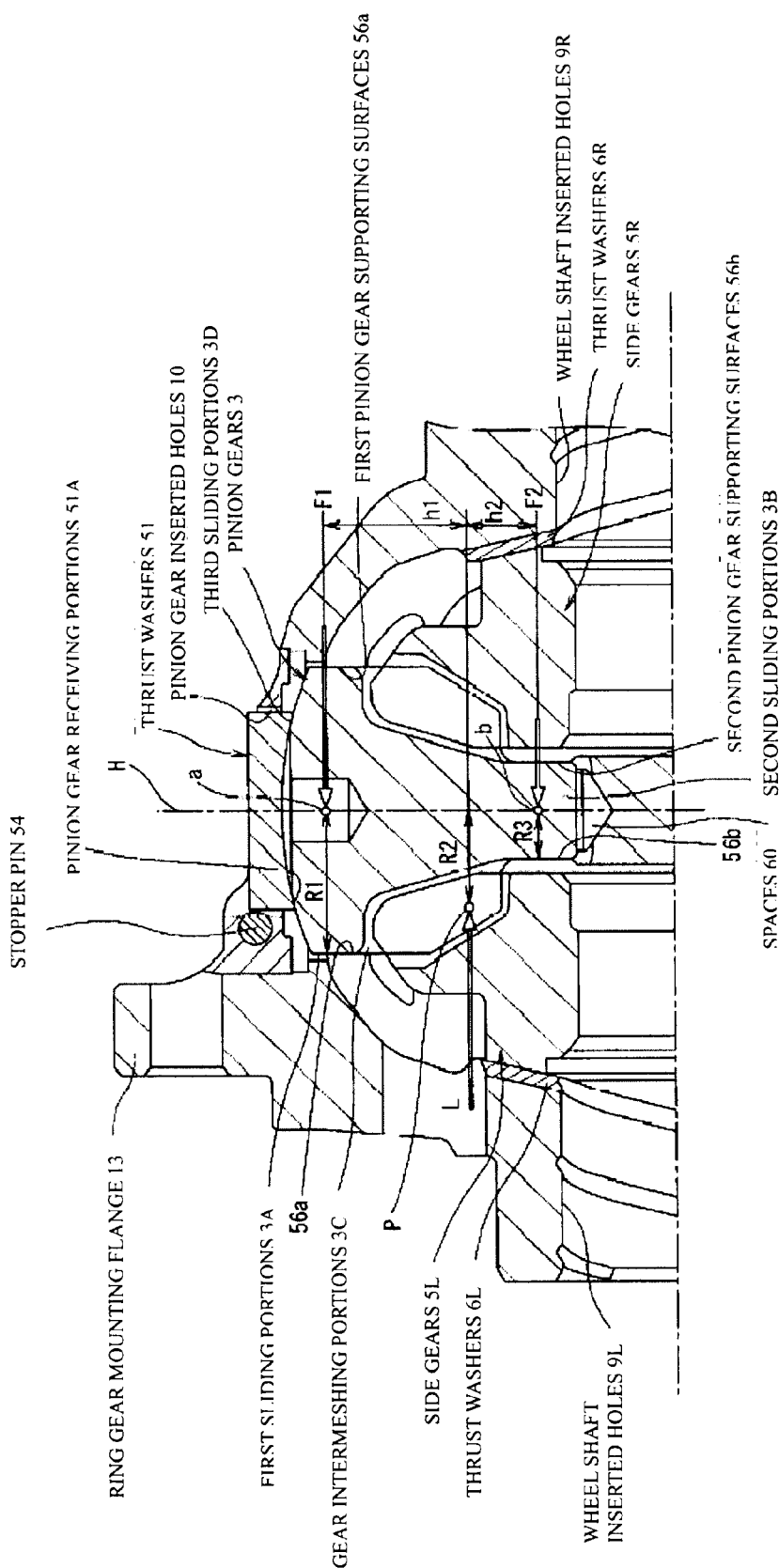
FIG. 7 is sectional diagram showing an operation of a differential device for a vehicle according to first embodiment of the present invention.

The operation of the differential device for the vehicle of the first embodiment of the present invention will be explained hereinafter. First of all, when torque from the engine of the vehicle is input to the differential case 2 through the drive pinion and the ring gear, the differential case 2 is rotated around the rotating axis O. Upon the rotation of the differential case 2, rotational force is transferred to the pinion gears 3, 4 and to the side gears 5R, 5L through the pinion gears 3, 4. Because the right and left side gears 5R, 5L are respectively engaged with the unillustrated wheel shafts in spline meshing, torque from the engine is transmitted to the right and left wheel shafts through the drive pinion, the ring gear, the differential case 2, the pinion gears 3, 4 and the side gears 5L, 5R.

Where the vehicle is driven in straight line and there is no slip between the road and each tire on the right and left wheel shafts, the pinion gears 3, 4 is revolved on the side gears 5R, 5L without self-rotation around the rotational axis O and the pinion gears 3, 4 and the side gears 5R, 5L are rotated as a body with the differential case 2 so that torque from the engine is transmitted equally to right and left wheel shafts to rotate each tire at same rotational speed.

Where the right wheel drops into a muddy ground to occur a slip, the pinion gears 3, 4 are rotated around its own axis with intermeshing with the side gears 5R, 5L so that torque from the engine is distributed differently to the right and left tires. In actual, the left tire is rotated at lower speed than the speed of the differential case 2 and the right tire is rotated at higher speed than the speed of the differential case 2.

Where the pinion gears 3, 4 are rotated around its own axis during torque is actuated to the differential case 2, the first sliding portions 3A, 4A and the second sliding portions 3B, 4B are slid on the first pinion gear supporting portions 56a, 57a and the second pinion gear supporting portions 56b, 57b so that frictional resistance occurs between the first sliding portion 3A, 4A and the first pinion gear supporting surface 56a, 57a and between the second sliding portion 3B, 4B and the second pinion gear supporting surface 56b, 57b. Therefore, the differential rotation of the side gears 5R, 5L is restricted by the frictional resistance. In this situation, as shown in FIG. 7, where load L acts on the pinion gears 3, 4 from the side gears 5R, 5L based on the intermeshing between the side gears 5R, 5L and the pinion gears 3, 4, reaction force F1, F2 from the first pinion gear supporting surfaces 56a, 57a and the second pinion gear supporting surfaces 56b, 57b of the pinion gear supporter 53 act in dispersing on the first sliding portions 3A, 4A and the second sliding portions 3B, 4B so that the pinion gears 3, 4 rotates in stable state on the pinion gear supporter 53.

In this state, where P is an intermeshing point between the side gears 5R, 5L and the pinion gears 3, 4 and h1, h2 are distances in axial direction from the engaging point P to acting points a, b of the reaction forces F1, F2, the reaction forces F1, F2 are represented by the equation of "$F1=L\times h2/(h1+h2)$" and "$F2=L\times h1/(h1+h2)$". Where R1 is a radius of the first sliding portions 3A, 4A of the pinion gears 3, 4, R2 is a distance from the axis H of the pinion gears 3, 4 to the intermeshing point P and R3 is a radius of the second sliding portions 3B, 4B of the pinion gears 3, 4, a torque transmitting ratio T1 transmitted the torque from the pinion gears 3, 4 to the side gears 5R, 5L by the reaction force F1 is represented by the equation of "$T1=R1/R2$" and a torque transmitting ratio T2 transmitted the torque from the pinion gears 3, 4 to the side gears 5R, 5L by the reaction force F2 is represented by the equation of "$T2=R3/R2$".

By this rotation of the pinion gears 3, 4, thrust force is occurred on the intermeshing surface with the side gears 5R, 5L to its rotational axis direction of each of the pinion gears 3, 4 and the side gears 5R, 5L. Each of the side gears 5R, 5L is moved to be separated each other by the thrust force to push the thrust washers 6R, 6L in contact with the thrust washer receiving portions 9Ra, 9La so that frictional resistance is occurred between the thrust washers 6R, 6L and the thrust washer receiving portions 9Ra, 9La. Therefore, the differential rotation of the side gears 5R, 5L is also restricted by this second frictional resistance.

And also, the third sliding portions 3D, 4D of the pinion gears 3, 4 are pushed in contact with the pinion gear receiving portions 51A, 52A of the thrust washer 51, 52 by the thrust resistance occurred on the pinion gears 3, 4 so that frictional resistance is occurred against the rotation of the pinion gears 3, 4 around its own axis. Therefore, the differential rotation of the side gears 5R, 5L is also restricted by this third frictional resistance.

Next, an assembling method of the differential device for the vehicle according to the first embodiment of the present invention will be explained hereinafter. The assembling method of the differential device for the vehicle according to the first embodiment is performed in order of each step of "assemble of side gear", "assemble of pinion gear", "attachment of the thrust washer" and "engagement of pinion gear and side gear" so that each step will be explained in order.

"Assemble of Side Gear"

Each of side gears 5R, 5L is inserted into the differential case 2 through the side gear penetrating openings 12R, 12L from outside, thereafter, sliding from the different direction each other along the thrust washer receiving portions 9Ra, 9La to coincide each gear axis with the rotational axis O to be accommodated in a predetermined position inside the differential case 2.

"Assemble of Pinion Gear"

After the pinion gears 3, 4 are inserted into the differential case 2 through the pinion gear inserted holes 10, 11, the pinion gears 3, 4 are accommodated in the recess spaces 60, 61 of the pinion gear supporter 53 to support the first sliding portions 3A, 4A and the second sliding portions 3B, 4B on the first pinion gear supporting portions 56A, 57A and the second pinion gear supporting portions 56B, 57B to be installed in a predetermined position inside the differential case 2.

"Attachment of the Thrust Washer"

After the convex portions 51B, 52B of the thrust washers 51, 52 are fit to the concave portions 10A, 11A of the pinion gear inserted hole 10, 11 and the thrust washer 51, 52 is positioned in the axial direction of the pinion gear inserted holes 10, 11, the thrust washers 51, 52 are rotated by 90 degrees and the stopper pin 54, 55 fix the thrust washers 51, 52 around the axis of the pinion gear inserted holes 10, 11 to be installed in a predetermined position inside the differential case 2.

"Engagement of Pinion Gear and Side Gear"

The thrust washers 6R, 6L are installed between the boss portions 5Ra, 5La of the side gears 5R, 5L and the thrust washer receiving portions 9Ra, 9La of the wheel shaft inserted holes 9R, 9L during adjusting the axial size between the thrust washer receiving portions 9Ra, 9La and the side gears 5R, 5L in order to engage in mesh the side gears 5R, 5L with the pinion gears 3, 4 on the rotational axis O of the differential case 2.

Second Embodiment of the Present Invention

Figure 8:
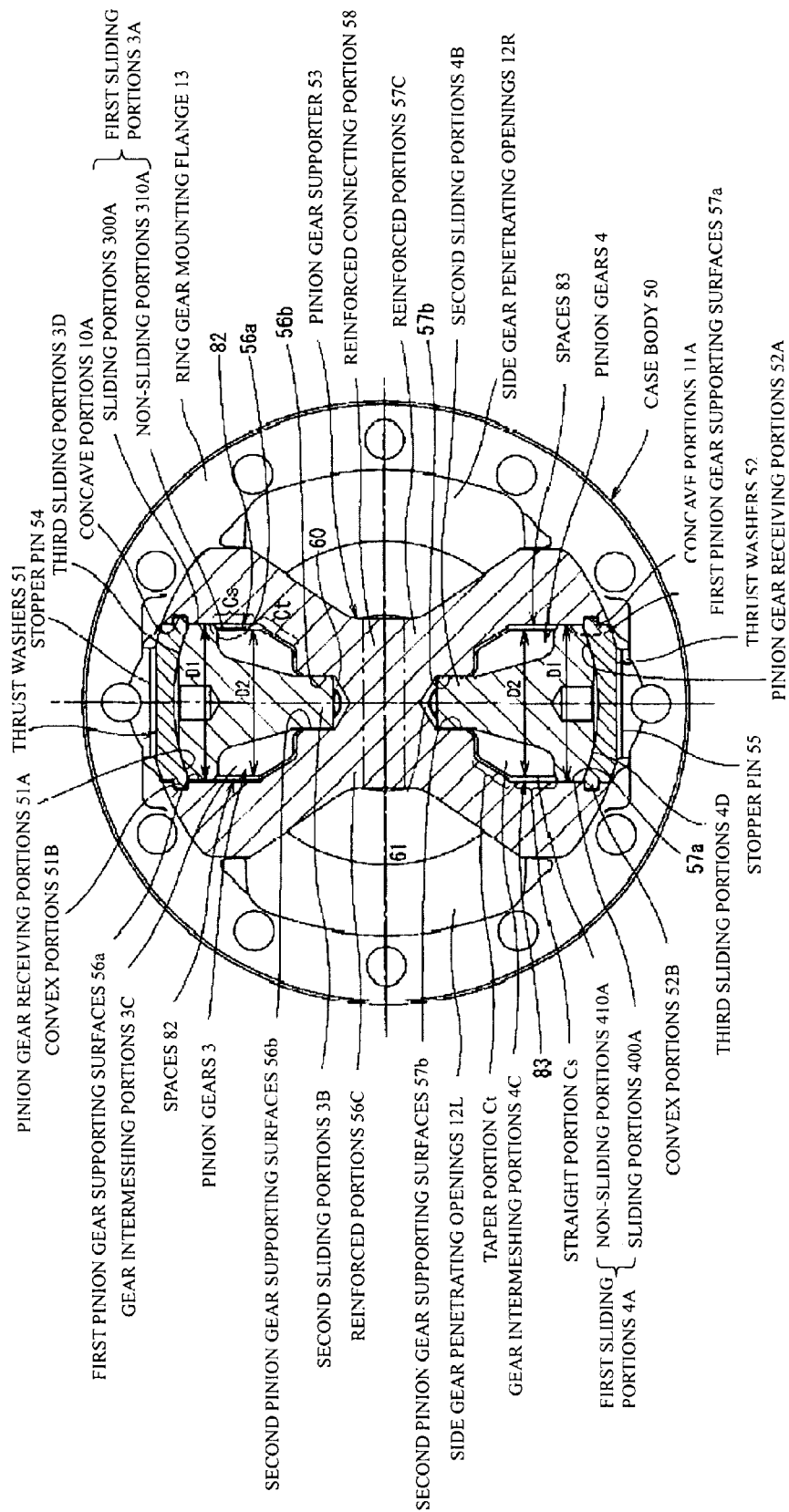
FIG. 8 is a cross sectional drawing cut in perpendicular to a rotational axis of a differential case of a differential device for a vehicle according to second embodiment of the present invention.

The second embodiment of the differential device for the vehicle according to the present invention will be explained hereinafter based on FIG. 8. A numeral in FIG. 8 having the same numeral in FIGS. 1-7 is the same member and function so that these are not explained.

A gist of the differential device 81 for the vehicle of the second embodiment is that the first sliding portions 3A, 4A are formed only on the annular portions without having the gear tooth intermeshing with the side gears 5R, 5L.

In other words, the peripheral surfaces of the first sliding portions 3A, 4A having the gear tooth intermeshing with the side gears 5R, 5L do not contact nor slide on the pinion gear supporting portions 56, 57, therefore, the pinion gear 3, 4 have non-sliding portions 310A, 410A not sliding on the first pinion gear supporting surfaces 56a, 57a of the pinion gear supporting portions 56, 57 of the pinion gear supporter 53 in a side of the gear nose of the first sliding portions 3A, 4A.

Each of outer diameters D2 of the non-sliding portions 310A, 410A is smaller than each of outer diameters D1 of sliding portions 300A, 400A, that is D1>D2, to make annular spaces 82, 83 on the first pinion gear supporting surfaces 56a, 57a of the pinion gear supporting portions 56, 57.

It is desirable for the length of the spaces 82, 83 to a diameter direction to be set in a way that there is no invasion of contamination by the pinion gears 3, 4 nor no burning and sticking of contamination on the pinion gear supporting portions 56, 57 and the pinion gears 3, 4.

Third Embodiment of the Present Invention

The third embodiment of the differential device for the vehicle according to the present invention will be explained hereinafter based on FIG. 9 to FIG. 12. A numeral in FIGS. 9-12 having the same numeral in FIGS. 1-7 is the same member and function so that these are not explained.

A gist of the differential device 91 for the vehicle of the third embodiment is that the pinion gear supporter 53 is movable along the rotational axis O to maintain stable intermeshing between the pinion gears 3, 4 and the side gears 5R, 5L.

Figure 9:
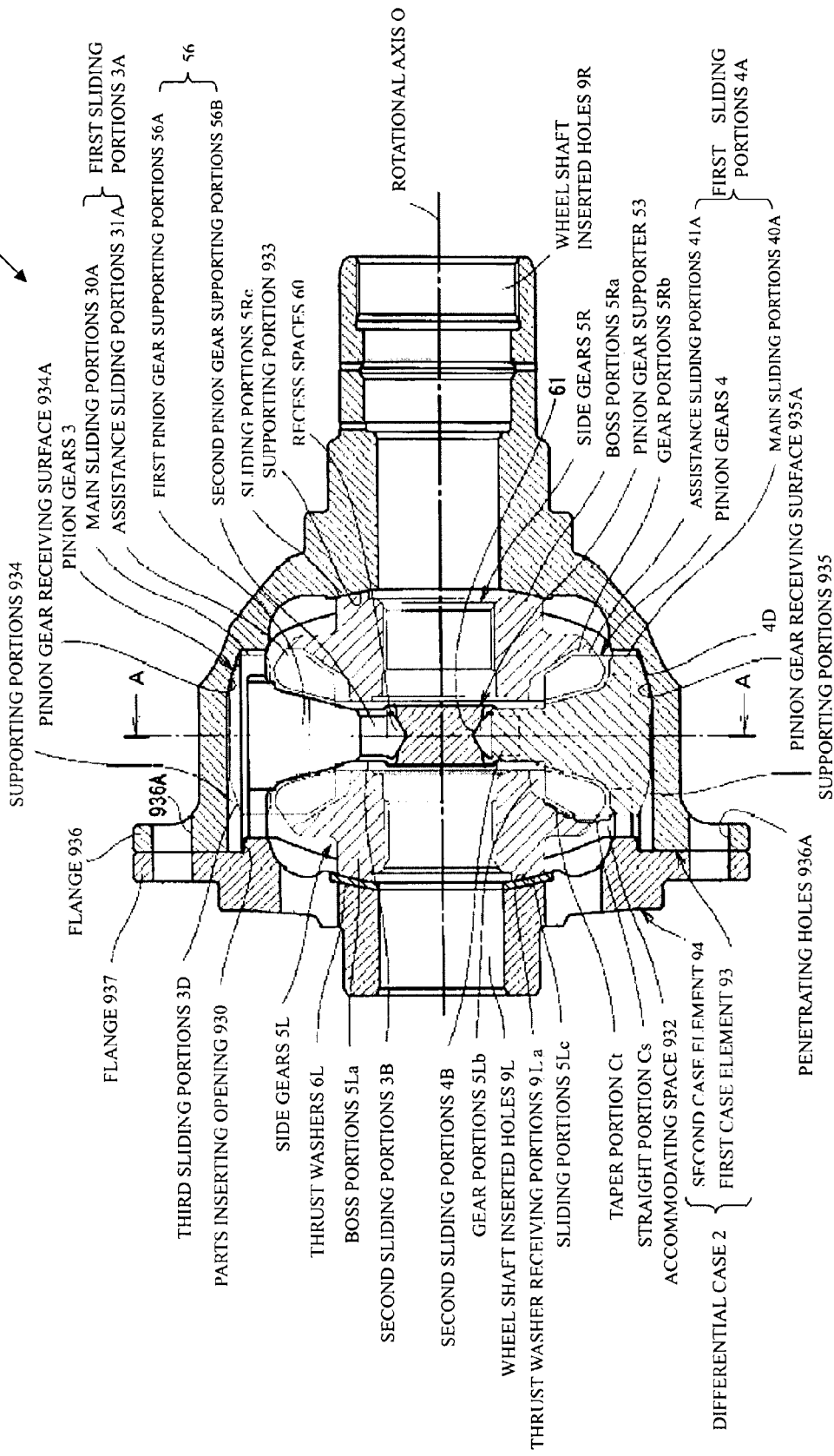
FIG. 9 is a horizontally cut sectional drawing in parallel to a rotational axis explaining a differential device for a vehicle according to third embodiment of the present invention.
Figure 10:
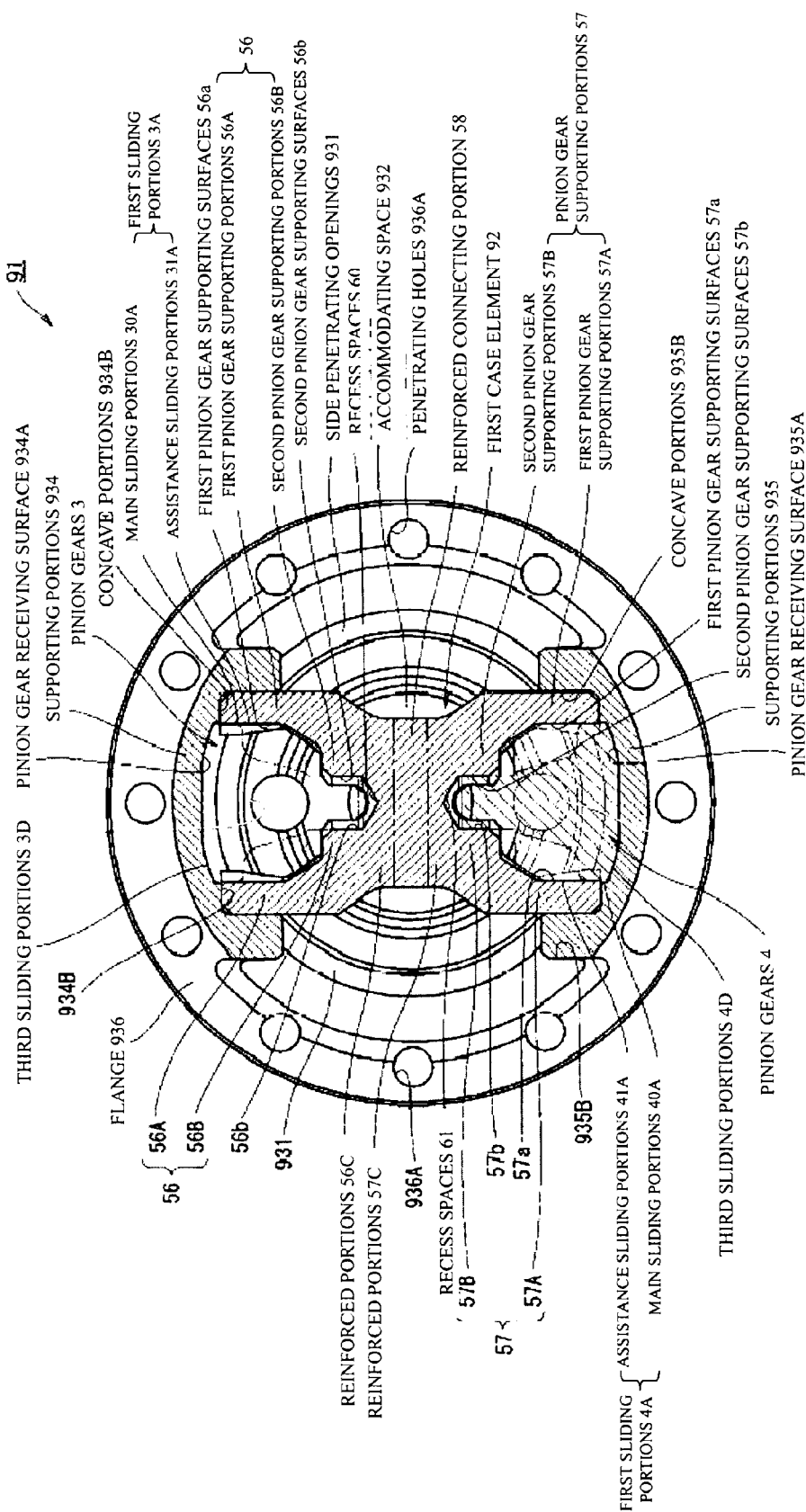
FIG. 10 is a cross sectional drawing cut along a line of A-A in FIG. 9.
Figure 11:
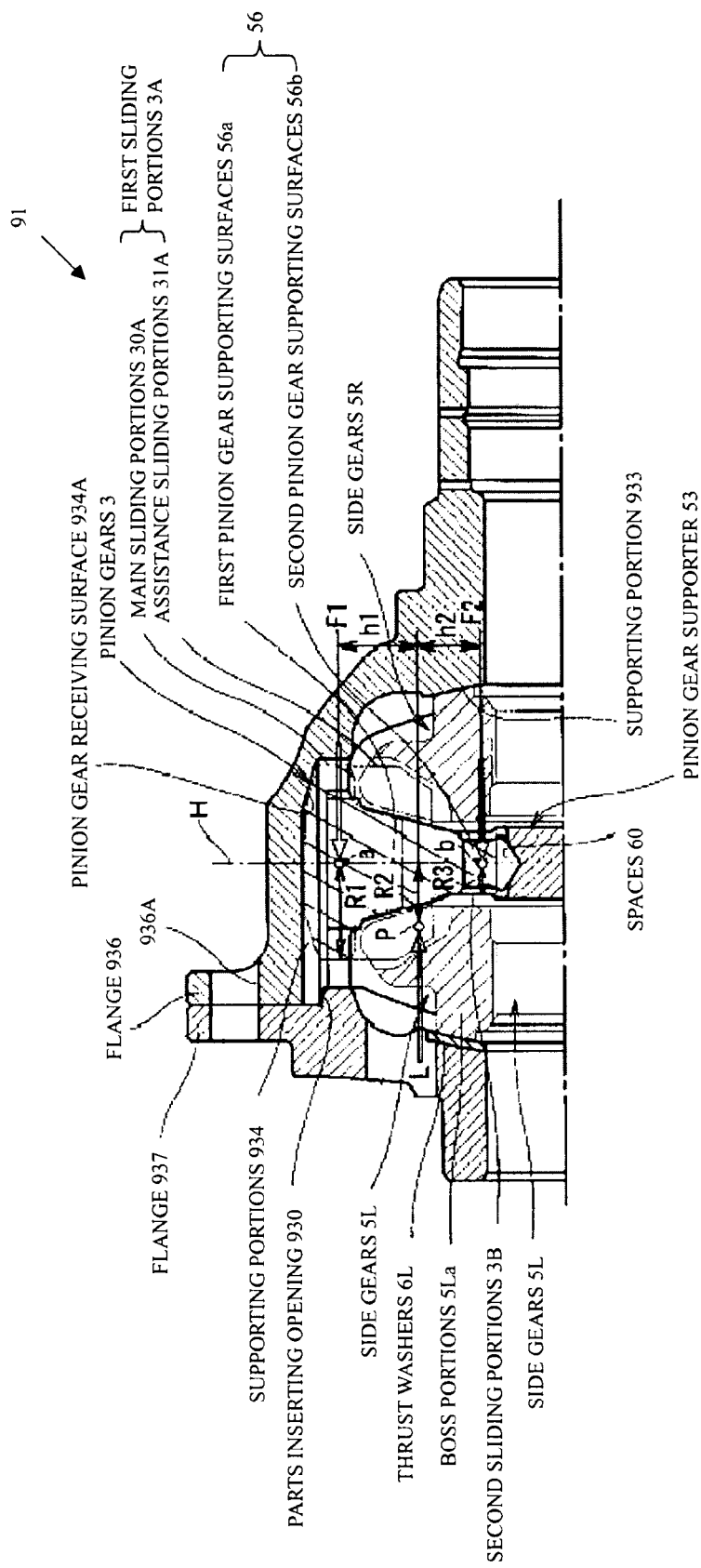
FIG. 11 is sectional diagram showing an operation of a differential device for a vehicle according to third embodiment of the present invention.

The differential case 2 has two elements of first case element 93 and second case element 94 as shown in FIG. 9. The first case element 93 equips a parts inserting opening 930 opening to one direction along the rotational axis O and side penetrating openings 931, 931 (as shown in FIG. 10) along an axis perpendicular to the rotational axis O. The second case element 93 covers the parts inserting opening 930 of the first case element 92.

An accommodating space 932 of the first case element 93 communicates with the parts inserting opening 930, and in the accommodating space 932 are accommodated the side gears 5R, 5L and the pinion gear supporter 53 accommodating the pinion gears 3, 4.

From an inner surface of the first case element 93 are extended a pair of supporting portions 934, 935 for the pinion gear supporter 53 into the accommodating space 930, and the supporting portions 934, 935 are mounted at equal distance of 180 degrees around the rotational axis O.

The supporting portions 934, 935 are formed with a projection of letter U shape in a cross section to accommodate the back surface edge portions of the pinion gears 3, 4. In the supporting portion 934 is equipped with a pinion gear receiving surface 934A formed with a spherical surface fitting to the back surface of the pinion gear 3 and in the supporting portion 935 is equipped with a pinion gear receiving surface 935A formed with a spherical surface fitting to the back surface of the pinion gear 4. And also, in the supporting portion 934 is equipped with concave portions 934B, 934B fitting to upper end portions of the pinion gear supporter 53 along the rotational axis O and in the supporting portion 935 is equipped with concave portions 935B, 935B fitting to lower end portions of the pinion gear supporter 53 along the rotational axis O.

The concave portions 934B, 934B are extending parallel each other along the rotational axis O and the concave portions 935B, 935B are also extending parallel each other along the rotational axis O. The concave portions 934B, 934B, 935B, 935B are opened to three directions of the sides of the parts inserting opening 930, pinion gears 3, 4 and the rotational axis O and closed to three directions including the opposite side of the parts inserting opening 930.

On the peripheral surface of the first case element 93 in the side of the parts inserting opening 930 is mounted an annular flange 936 projected outside of the differential case 2 in order to assemble the ring gear and the case elements. The flange 936 equips a plurality of penetrating holes 936A, 936A and so on positioned at a predetermined equal distance each other. A number of the penetrating holes 936A is twelve.

On the peripheral surface of the second case element 94 in the side of the parts inserting opening 930 is mounted an annular flange 937 projected outside of the differential case 2 in order to assemble the ring gear and the case elements. The flange 936 equips a plurality of penetrating holes 936A, 936A and so on positioned at a predetermined equal distance each other. A number of the penetrating holes 936A is twelve.

The gear intermeshing portions 3C, 4C of the pinion gears 3, 4 have a straight portion Cs including the assistance sliding portions 31A, 41A and a taper portion Ct continuing from the straight portion Cs and engage with the side gears 5R, 5L in the side of the rotational axis O. The third sliding portions 3D, 4D of the pinion gears 3, 4 fit to the pinion gear receiving surfaces 934A, 935A of the supporting portions 934, 935 on the back surface of the first sliding portions 3A, 4A.

There is not any thrust washer in the side of the side gear 5R of the side gears 5R, 5L but the side gear 5R has the sliding portion 5Rc fitting to a side gear supporting portion 933 having a spherical surface to support slidably the back surface of the side gear 5R.

Right and left upper end portions of the pinion gear supporter 53 fit to the concave portions 934B, 934B and right and left lower end portions of the pinion gear supporter 53 fit to the concave portions 935B, 935B so that the pinion gear supporter 53 is supported by the supporting portions 934, 935 to be movable along the rotational axis O and installed non-rotatably in the first case element 93 around the rotational axis O of the differential case 2.

The operation of the third embodiment different from the first embodiment will be explained hereinafter.

Where the pinion gears 3, 4 rotate in engagement in mesh with the side gears 5R, 5L, the pinion gear supporter 53 moves by itself in the direction of the rotational axis O to be positioned at the place where the pinion gears 3, 4 equally engage in mesh with the side gear 5R and the side gear 5L, that is rotational axes of the pinion gears 3, 4 are automatically positioned at equal distance from the side gear 5R and the side gear 5L because the pinion gear supporter 53 is movable along the rotational axis O so that the stable intermeshing of the pinion gears 3, 4 with the side gears 5R, 5L is automatically maintained to be able to achieve stable differential restriction force.

The assembling method of the third embodiment is quite different from that of the first embodiment and will be explained hereinafter.

The assembling method is performed in order of each step of "assemble of right side gear", "assemble of pinion gear", "assemble of left side gear" and "engagement of pinion gear and side gear" so that each step will be explained in order.

"Assemble of Right Side Gear"

The right side gear 5R is inserted into the first case element 93 from outside of the first case element 93 to contact the boss portion 5Ra of the back surface portion with the supporting portion 933 and to position the axis of the side gear 5R to coincide with the axis of the wheel shaft inserted hole 9R, positioning the side gear 5R at the predetermined position in the first case element 93.

"Assemble of Pinion Gear"

First of all, the pinion gears 3, 4 are accommodated in the recess spaces 60, 61 of the pinion gear supporter 53. Next, the pinion gear supporter 53 having the pinion gears 3, 4 is inserted into the first case element 93 through the parts inserting opening 930 to be placed in predetermined position. During the insertion of the pinion gear supporter 53, the pinion gear supporter 53 slides along the rotational axis O toward the side gear 5R from the parts inserting opening 930 by the way that the right and left upper end portions of the pinion gear supporter 53 fit to the concave portions 934A, 934A and the right and left lower end portions of the pinion gear supporter 53 fit to the concave portions 935A, 935A.

"Assemble of Left Side Gear"

The left side gear 5L is inserted into the first case element 93 from outside of the first case element 93 to position the axis of the side gear 5L to coincide with the axis of the wheel shaft inserted hole 9L, positioning the side gear 5L at the predetermined position in the first case element 93.

"Engagement of Pinion Gear and Side Gear"

The thrust washer 6L is inserted from the parts inserting opening 930 into the differential case 2 to contact with the boss portion 5La of the side gear 5L during adjusting the axial size between the thrust washer receiving portions 9La and the side gear 5L. Next the second case element 94 is assembled to the first case element 93 by bolts during the thrust washer 6L is installed between the boss portions 5La of the side gear 5L and the thrust washer receiving portions 9La of the wheel shaft inserted hole 9L to construct the differential case 2. As explained in the operation of the third embodiment of the present invention, the pinion gear supporter 53 is moved to the axial direction of the rotational axis O to support the pinion gears 3, 4 in good engagement with the side gears 5R, 5L.

Another Embodiment

While the invention has been described in detail with reference to the preferred embodiment, it will be apparent to those skilled in the art that the invention is not limited to the present embodiment, and that the invention may be realized in various other embodiments within the scope of the claims, for example;

In the first embodiment of the present invention, the assistance sliding portions 31A, 41A has been equipped same dimension of its radius in a full range of the sliding portion compared to the main sliding portions 30A, 40A of the first sliding portion 3A, 4A of the pinion gears 3, 4, however, the assistance sliding portions 31A, 41A may be equipped a different radius in the full range of the sliding portion or a different radius in a part of the sliding portion.

In each embodiment of the present invention, the pinion gear and its supporting portion has been a pair of pinion gears 3, 4 and a pair of supporting portions 56, 57, however, they may be one pinion gear and one supporting portion, or three and more pinion gears and pinion gear supporting portions by setting smaller diameter of the pinion gears.

In the first and second embodiments of the present invention, the pinion gear supporter 53 has been mounted as a whole body with the inner surface of the case body 50 of the differential case 2, however, the pinion gear supporter 53 may be separated another material from the differential case 2 as explained in the third embodiment of the present invention.

In the first and second embodiment of the present invention, the assistance sliding portions 31A, 41A and the non-sliding portion 310A, 410A of the first sliding portions 3A, 4A of the pinion gears 3, 4 has been formed by the straight portion Cs, however, they may be formed by the taper portion Ct.

Figure 12:
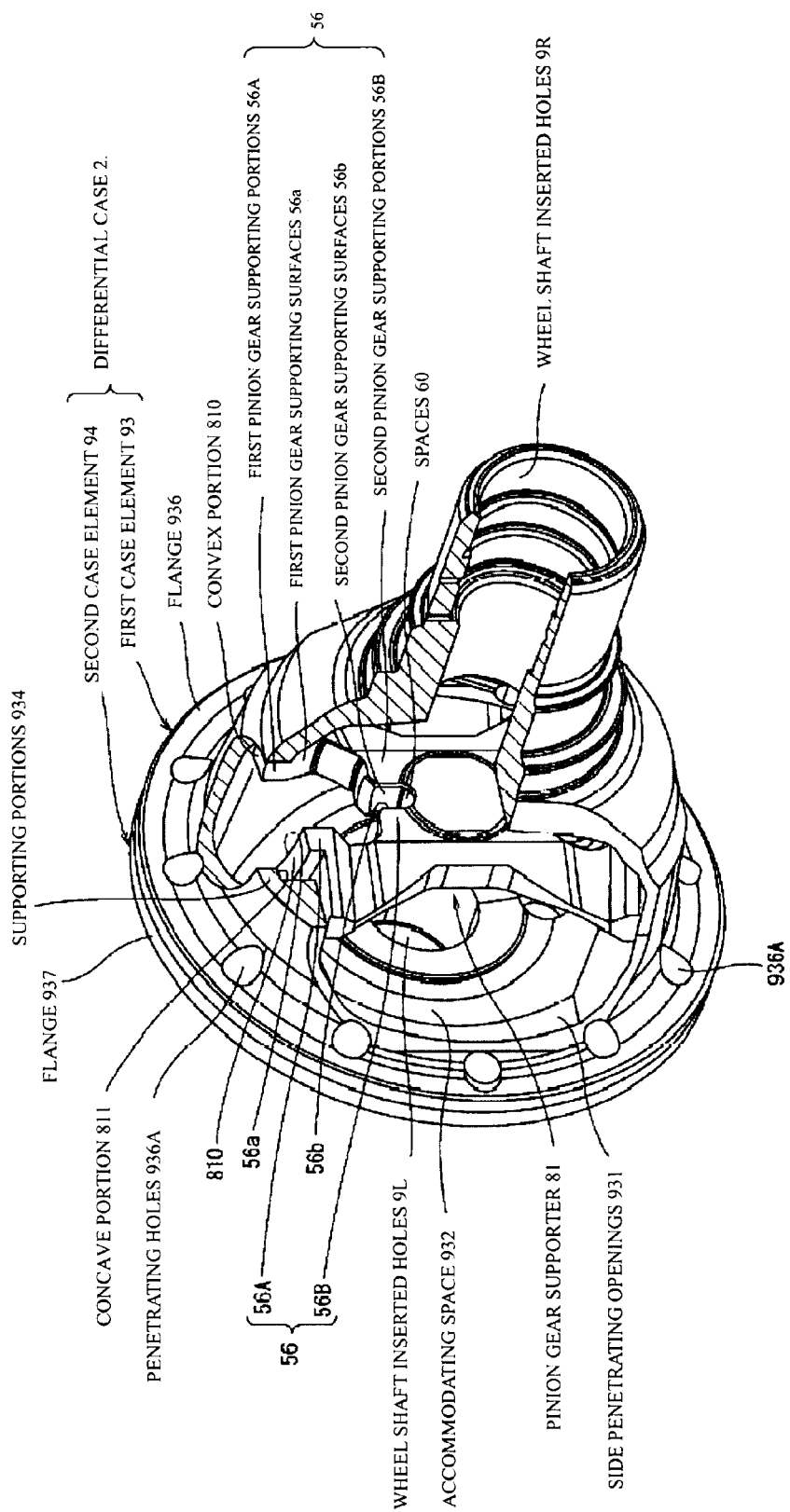
FIG. 12 is a divided oblique perspective diagram explaining an accommodating state of the pinion gear supporter in a differential case of another embodiment of the present invention.

In the third embodiment of the present invention, the concave portions 934A, 934A have fit one side of the right and left sides of pinion gear supporter 53 to the supporting portion 934 and fit another side of the right and left sides of pinion gear supporter 53 to the supporting portion 935, however, it may be constructed that a convex portion 810 is formed, as shown in FIG. 12, on ends of both right and left sides of a pinion gear supporter 81 and a concave portion 811 fit to the convex portion 810 is formed on each of supporting portions 934, 935 of the differential case 2. Or it may be constructed that a concave portion is formed on the pinion gear supporter and the convex portion fit to the concave portion is formed on the supporting portion of the differential case 2.

What is claimed is:

1. A differential case for a vehicle comprising:
   a case body accommodating a pair of side gears and shaftless pinion gears engaging in mesh with said side gears, axes of said pinion gears being perpendicular to axes of side gears; and
   a pinion gear supporter accommodated in said case body and having a pinion gear supporting portion to install said pinion gear in a recess space of said pinion gear supporter and to support slidably an outer peripheral surface of said pinion gear for rotation of said pinion gear, wherein said pinion gear supporter accommodated in said case body has interconnected portions respectively slidably supporting the outer peripheral surfaces of a pinion gears,
   wherein said interconnected portions are connected at a connecting portion positioned between said pair of side gears, and wherein said pinion gear supporter is constructed as said letter X, and a width of both sides of said pinion gear supporter is smaller than a width of a middle portion of said pinion gear supporter.

2. A differential case for a vehicle comprising:
   a case body accommodating a pair of side gears and a pinion gear engaging in mesh with said side gears, an axis of said pinion gear is perpendicular to axes of side gears; and
   a shaftless pinion gear supporter accommodated in said case body and having a pinion gear supporting portion to install said pinion gear in a recess space of said pinion gear supporter and to support slidably an outer peripheral surface of said pinion gear for rotation of said pinion gear, wherein said pinion gear supporter has a pair of pinion gear supporting portions supporting slidably a pair of said pinion gears respectively, wherein said pair of pinion gear supporting portions of said pinion gear supporter are formed as a body through a connecting portion being reinforced, and said reinforced connecting portion is positioned between said pair of side gears,
   wherein each of said pair of pinion gear supporting portions of said pinion gear supporter comprises first pinion gear supporting portion and second pinion gear supporting portion, said first pinion gear supporting portion supports rotatably said outer peripheral surface of an end portion in a side of a gear base of both ends of said pinion gear along an axial direction, and said second pinion gear supporting portion supports rotatably said outer peripheral surface of an end portion in a side of a gear nose of both ends of said pinion gear along an axial direction.

3. A differential case for a vehicle according to claim 2, wherein said first pinion gear supporting portion is positioned in an opposite side of an engaging point of said pair of pinion gears with said pair of side gears to a rotational axis of said differential case along an axial direction of said pair of pinion gears, and said second pinion gear supporting portion is positioned in a side of said rotational axis of an engaging point of said pair of pinion gears with said pair of side gears along said axial direction of said pair of pinion gears.

4. A differential case for a vehicle according to claim 2, wherein said first pinion gear supporting portion and said second pinion gear supporting portion are respectively formed at a plurality of positions around said axis of said pinion gears in equal distance to each other.

5. A differential case for a vehicle according to claim 4, wherein said first pinion gear supporting portion has first pinion gear supporting surface equipping a curvature surface being a curvature of a predetermined radius, and said second pinion gear supporting portion has second pinion gear supporting surface equipping a curvature surface having a smaller curvature of a predetermined radius than said curvature of said first pinion gear supporting surface.

6. A differential case for a vehicle according to claim 1, wherein said pinion gear supporter accommodated in said case body is movable along a rotational axis of said differential case.

7. A differential case for a vehicle comprising:
   a case body accommodating a pair of side gears and a pinion gear engaging in mesh with said side gears, an axis of said pinion gear is perpendicular to axes of side gears; and
   a shaftless pinion gear supporter accommodated in said case body and having a pinion gear supporting portion to install said pinion gear in a recess space of said pinion gear supporter and to support slidably an outer peripheral surface of said pinion gear for rotation of said pinion gear, wherein said pinion gear supporter has a pair of pinion gear supporting portions supporting slidably a pair of said pinion gears respectively, wherein said pinion gear supporter accommodated in said case body is movable along a rotational axis of said differential case,
   wherein said pair of pinion gear supporting portions of said pinion gear supporter are formed as a body through a connecting portion being reinforced, said pinion gear supporter is movably mounted on a supporting portion formed on an inner surface of said differential case, and said supporting portion is extended along said rotational axis of said differential case.

8. A differential case for a vehicle according to claim 7, wherein each of said pair of pinion gear supporting portions of said pinion gear supporter comprises first pinion gear supporting portion and second pinion gear supporting portion, said first pinion gear supporting portion supports rotatably said outer peripheral surface of an end portion in a side of a gear base of both ends of said pinion gear along an axial direction, and said second pinion gear supporting portion supports rotatably said outer peripheral surface of an end portion in a side of a gear nose of both ends of said pinion gear along an axial direction.

9. A differential case for a vehicle according to claim 8, wherein said first pinion gear supporting portion and said second pinion gear supporting portion are respectively formed at a plurality of positions around said axis of said pinion gears in equal distance to each other.

10. A differential case for a vehicle according to claim 9, wherein said first pinion gear supporting portion has first pinion gear supporting surface equipping a curvature surface being a curvature of a predetermined radius, and said second pinion gear supporting portion has second pinion gear supporting surface equipping a curvature surface having a smaller curvature of a predetermined radius than said curvature of first pinion gear supporting surface.

11. A differential device for a vehicle comprising:
a differential case;
a pair of side gears accommodated in said differential case; and
a pair of pinion gears engaging in mesh with said pair of side gears and installed on an axis perpendicular to a rotational axis of said differential case, an axis of said pinion gear is perpendicular to axes of side gears,
said differential case comprising:
a case body accommodating said pair of side gears and said pair of pinion gears; and a pinion gear supporter accommodated in said case body and having a pair of pinion gear supporting portions to install each of said pair of pinion gears in a recess space of said pinion gear supporter and to support slidably an outer peripheral surface of said pair of pinion gears for rotation of said pair of pinion gears,
wherein each of said pair of pinion gears having a first sliding portion to slide on said pair of pinion gear supporting portions at an opposite side to said rotational axis side of said differential case of both sides of the pinion gear supporting portion along axial direction of said pinion gear supporting portions, a second sliding portion to slide on said pair of pinion gear supporting portions at a side of rotational axis of said differential case of both sides of said pinion gear supporting portion along axial direction of said pinion gear supporting portions, and a gear engaging portion in mesh with said pair of side gears between said first sliding portion and said second sliding portion.

12. A differential device for a vehicle according to claim 11, wherein said first sliding portion is formed as an annular sliding portions without having any gear tooth engaging in mesh with said pair of side gears, and an outer peripheral surface of said gear tooth of said pair of pinion gears engaging in mesh with said pair of side gears is a non-sliding portion against said pair of pinion gear supporting portions.

13. A differential device for a vehicle comprising:
a differential case;
a pair of side gears accommodated in said differential case; and
a pair of pinion gears engaging in mesh with said pair of side gears and installed on an axis perpendicular to a rotational axis of said differential case, an axis of said pinion gear is perpendicular to axes of side gears,
said differential case comprising:
a case element accommodating said pair of side gears and said pair of pinion gears; and
a pinion gear supporter accommodated in said case element and being movably mounted along said rotational axis of said differential case, said pinion gear supporter has a pair of pinion gear supporting portions to install each of said pair of pinion gears in a recess space of said pinion gear supporter and to support slidably an outer peripheral surface of said pair of pinion gears for rotation of said pair of pinion gears,
wherein each of said pair of pinion gears having a first sliding portion to slide on said pair of pinion gear supporting portions at an opposite side to said rotational axis side of said differential case of both sides of said pinion gear supporting portion along axial direction of said pinion gear supporting portions, a second sliding portion to slide on said pair of pinion gear supporting portions at a side of rotational axis of said differential case of both sides of the pinion gear supporting portion along axial direction of said pinion gear supporting portions, and a gear engaging portion in mesh with said pair of side gears between said first sliding portion and said second sliding portion.

* * * * *